(12) United States Patent
Minoura et al.

(10) Patent No.: US 6,530,200 B1
(45) Date of Patent: Mar. 11, 2003

(54) LAWN MOWER

(75) Inventors: Akira Minoura, Osaka (JP); Takeshi Komorida, Sakai (JP); Kazuo Samejima, Kaizuka (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/653,047

(22) Filed: Sep. 1, 2000

(30) Foreign Application Priority Data

Mar. 30, 2000 (JP) ........................................ 2000-094604

(51) Int. Cl.⁷ .............................................. A01D 34/64
(52) U.S. Cl. ..................... 56/17.1; 56/15.2; 56/DIG. 22
(58) Field of Search ......................... 56/DIG. 22, 17.1, 56/15.2, 14.7, 15.9

(56) References Cited

U.S. PATENT DOCUMENTS

| | | | |
|---|---|---|---|
| 4,977,733 A | 12/1990 | Samejima et al. | 56/14.7 |
| 4,998,948 A | 3/1991 | Osterling | 56/12.6 |
| 5,381,648 A | 1/1995 | Seegert et al. | 56/17.1 |
| 5,410,923 A | 5/1995 | Yamashita et al. | 74/474 |
| 5,475,971 A * | 12/1995 | Good et al. | 56/14.9 |
| 5,483,789 A * | 1/1996 | Gummerson | 56/15.5 |
| 5,678,648 A | 10/1997 | Imanishi et al. | 180/68.1 |
| 5,913,802 A * | 6/1999 | Mullet et al. | 56/10.8 |
| 6,032,441 A * | 3/2000 | Gust et al. | 56/7 |
| 6,076,341 A * | 6/2000 | Gummerson | 56/17.2 |
| 6,122,903 A | 9/2000 | Hayashi et al. | 56/15.8 |
| 6,293,077 B1 * | 9/2001 | Plas et al. | 56/17.1 |

* cited by examiner

Primary Examiner—Thomas B. Will
Assistant Examiner—Meredith C. Petravick
(74) Attorney, Agent, or Firm—Webb Ziesenheim Logsdon Orkin & Hanson, P.C.

(57) ABSTRACT

A lawn mower includes a vehicle body, front wheels disposed in front positions of the vehicle body, rear wheels disposed in rear positions of the vehicle body, a mower unit suspended from the vehicle body between the front wheels and the rear wheels, and a driver's seat disposed on the vehicle body above the mower unit. A hydraulic cylinder for raising and lowering the mower unit is disposed above the mower unit and below the driver's seat. A hydraulic pump for supplying a hydraulic pressure to the hydraulic cylinder is disposed below the driver's seat and adjacent the hydraulic cylinder. An engine for driving the hydraulic pump disposed rearwardly of the driver's seat.

7 Claims, 7 Drawing Sheets

Fig. 8
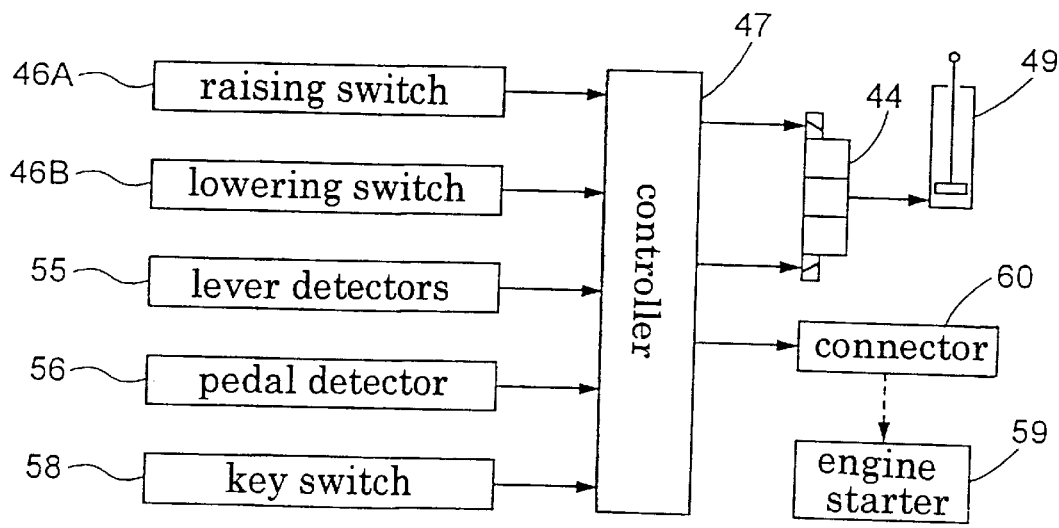
Fig. 9
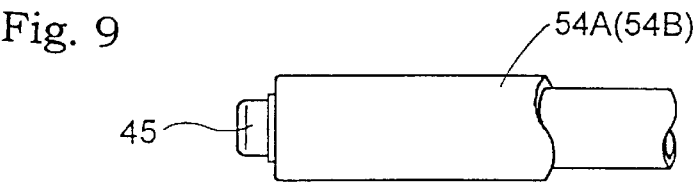
Fig. 10
Fig. 11
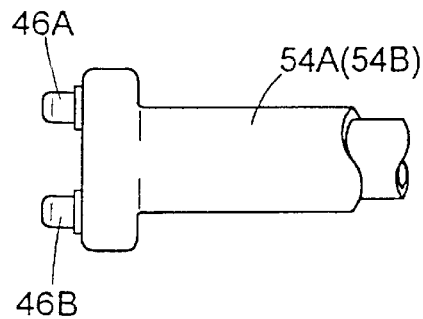
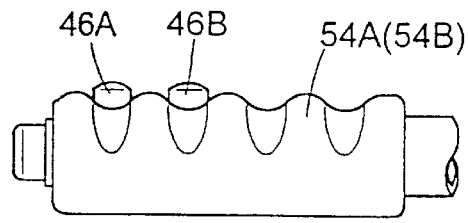

LAWN MOWER

BACKGROUND OF THE INVENTION

1. Field of the Invention

This invention relates to a lawn mower having a mower unit vertically movable to adjust a grass cutting height.

2. Description of the Related Art

In a typical conventional mechanism for raising and lowering a mower unit, the mower unit is attached to a vehicle body through a raising and lowering link mechanism which is vertically movable by a control lever (see U.S. Pat. Nos. 5,678,648 and 5,410,923).

However, where the above construction is employed, the control lever and other levers are disposed laterally of a driver's seat to be obstructive to the driver boarding or alighting from a driving platform. In addition, a great operating force is required to raise the mower unit with the control lever. To reduce this burden, gas springs or a gear mechanism must be employed for balance, which tends to render the mechanism considerably complicated.

SUMMARY OF THE INVENTION

The object of this invention is to provide a lawn mower having a mower unit raising and lowering function, in which a control lever for raising and lowering a mower unit is not obstructive to the driver boarding or alighting from the mower, a reduced burden falls on the driver in raising and lowering the mower unit, and a good vehicle body balance is maintained.

The above object is fulfilled, according to this invention, by a lawn mower comprising a vehicle body, front wheels disposed in front positions of the vehicle body, rear wheels disposed in rear positions of the vehicle body, a mower unit suspended from the vehicle body between the front wheels and the rear wheels, a driver's seat disposed on the vehicle body above the mower unit, and an actuator disposed above the mower unit and below the driver's seat for raising and lowering the mower unit.

In this construction, an actuator is employed to the burden falling on the driver in raising and lowering the mower unit. Further, this lift actuator disposed between the driver's seat and the mower unit is not obstructive to the driver boarding or alighting from the mower. This mower has an excellent body balance since the mower unit is disposed between the front and rear wheels, and the actuator is disposed above the mower unit. The actuator disposed between the front and rear wheels can receive a reaction from an upward movement of the mower unit in a stable way.

In a different lawn mower constructed to fulfill the above object, a hydraulic lift cylinder is used as the lift actuator, with a hydraulic pump disposed below the driver's seat and adjacent the hydraulic cylinder for supplying a hydraulic pressure to the hydraulic cylinder, and an engine disposed rearwardly of the driver's seat for driving the hydraulic pump.

This construction provides additional advantages of shortening the length of piping from the hydraulic cylinder to the hydraulic pump, and smoothening drive transmission from the engine or gearbox to the hydraulic pump.

In a preferred embodiment of this invention, the vehicle body includes a pair of right and left plate frames extending in a traveling direction, the actuator being disposed substantially between the plate frames. This construction allows the actuator to receive the reaction with increased stability.

As a preferred embodiment, the actuator may be operable by a control switch disposed on a steeling lever. It is then possible to dispense with a control post or lever dedicated to the control of the lift actuator.

Other features and advantages of this invention will be apparent from the following description of the embodiment to be taken with reference to the drawings.

BRIEF DESCRIPTION OF THE DRAWINGS

FIG. 8 is a block diagram of a control system.

FIG. 9 is a front view of a raising and lowering twin switch provided for a grip of the steering lever.

FIG. 10 is a front view of a modified raising and lowering twin switch.

FIG. 11 is a plan view of another modified raising and lowering twin switch.

DESCRIPTION OF THE PREFERRED EMBODIMENT

Figure 1:
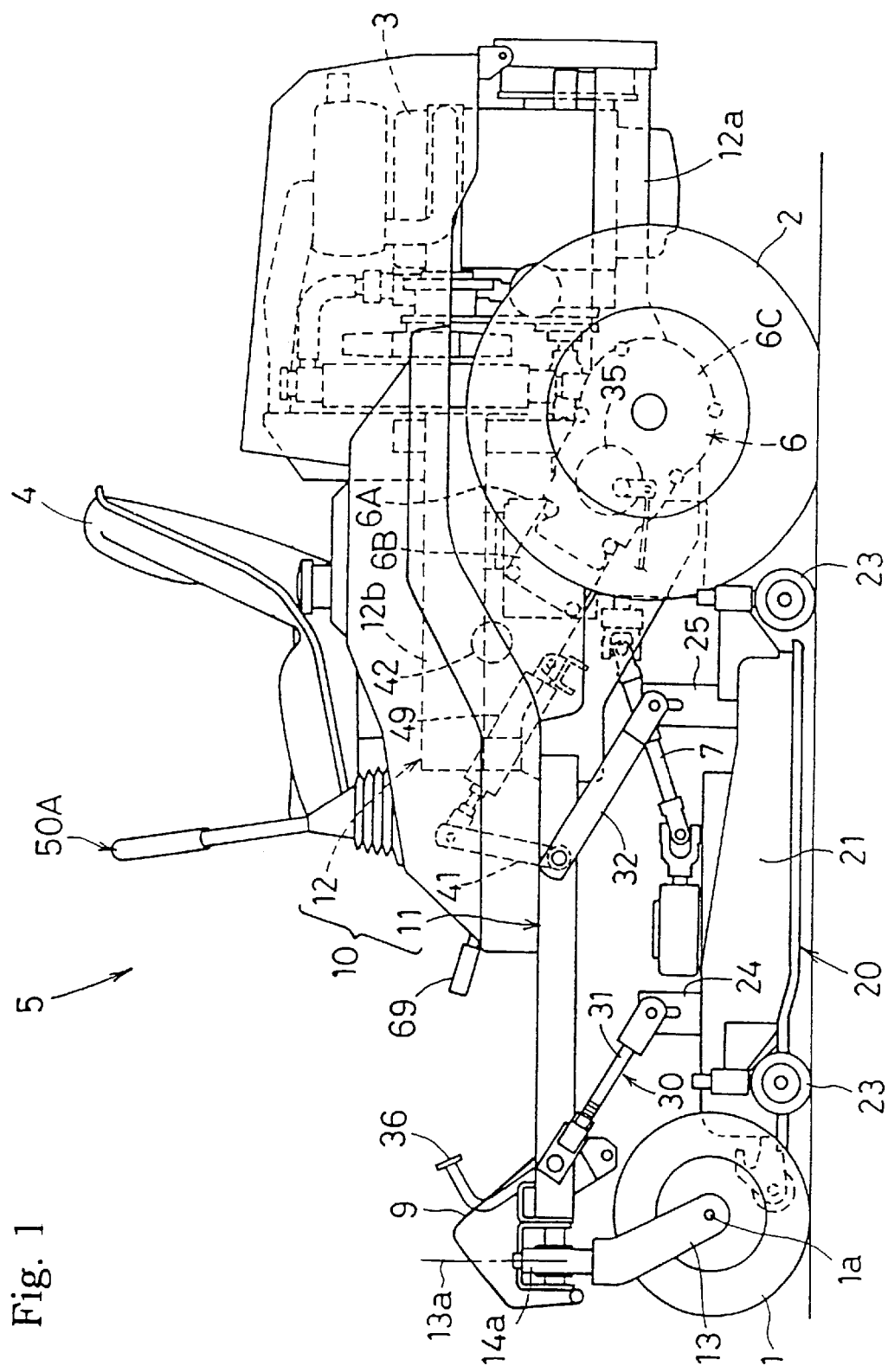
FIG. 1 is a side elevation of a lawn mower in one embodiment of this invention.
Figure 2:
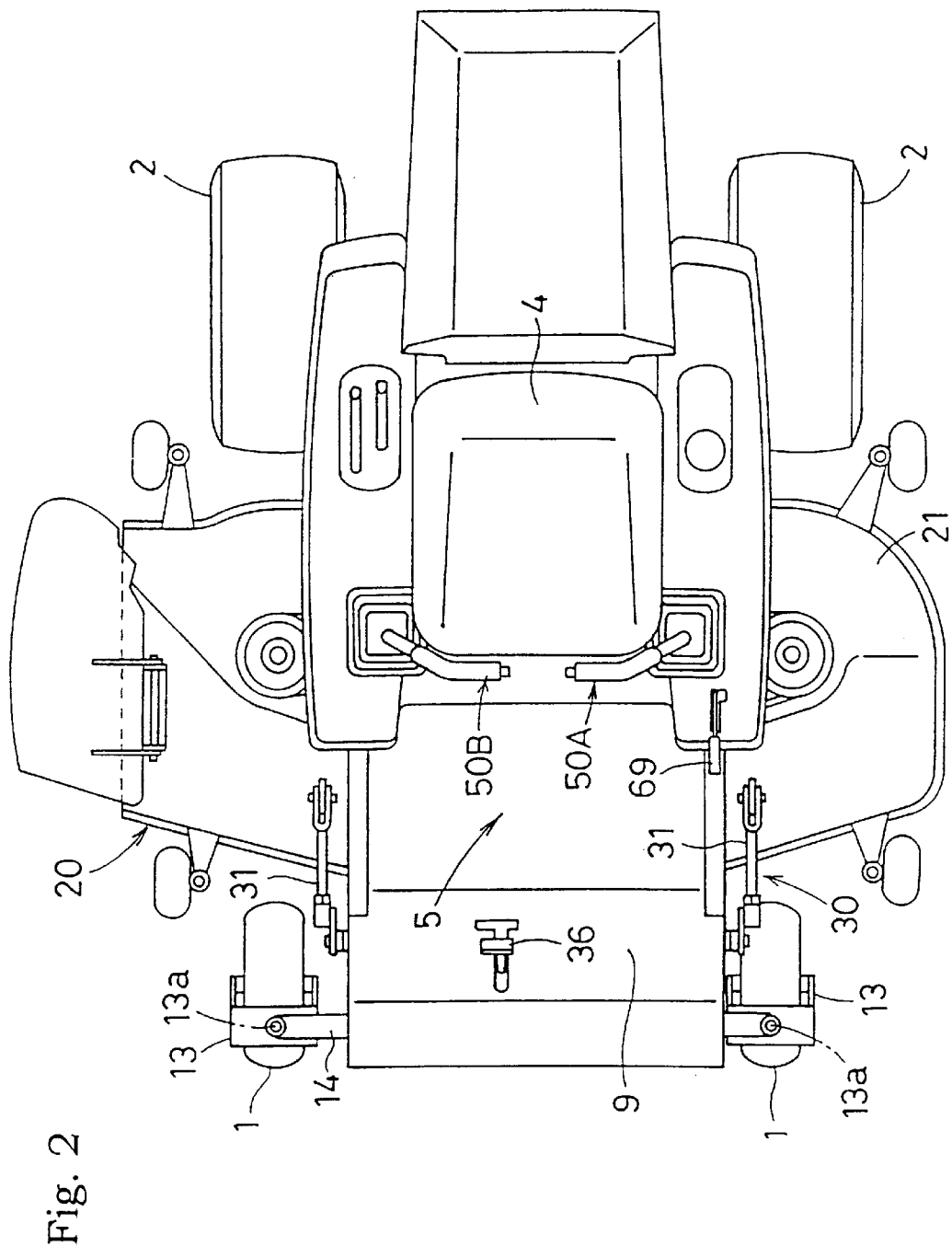
FIG. 2 is a plan view of the lawn mower shown in FIG. 1.

As shown in FIGS. 1 and 2, a riding lawn tractor includes a vehicle body 10 having a pair of right and left front wheels 1 freely rotatably attached to the front end thereof, and a pair of right and left rear wheel 2 drivably attached to the rear end. A motor section having an engine 3 is provided in a rear position vehicle body 10, slightly rearwardly of the axles of rear wheels 2. A driving platform 5 having a foot rest 9 and a driver's seat 4 is provided on the vehicle body 10 forwardly of the motor section. A mower unit 20 having a mower deck 21 is vertically movably suspended from the vehicle body 10 between the front and rear wheels through a link type connecting mechanism 30. The mower unit 20 receives torque from a transmission 6 disposed between the right and left rear wheels 2, which is transmitted through a rotary shaft 7.

Figure 3:
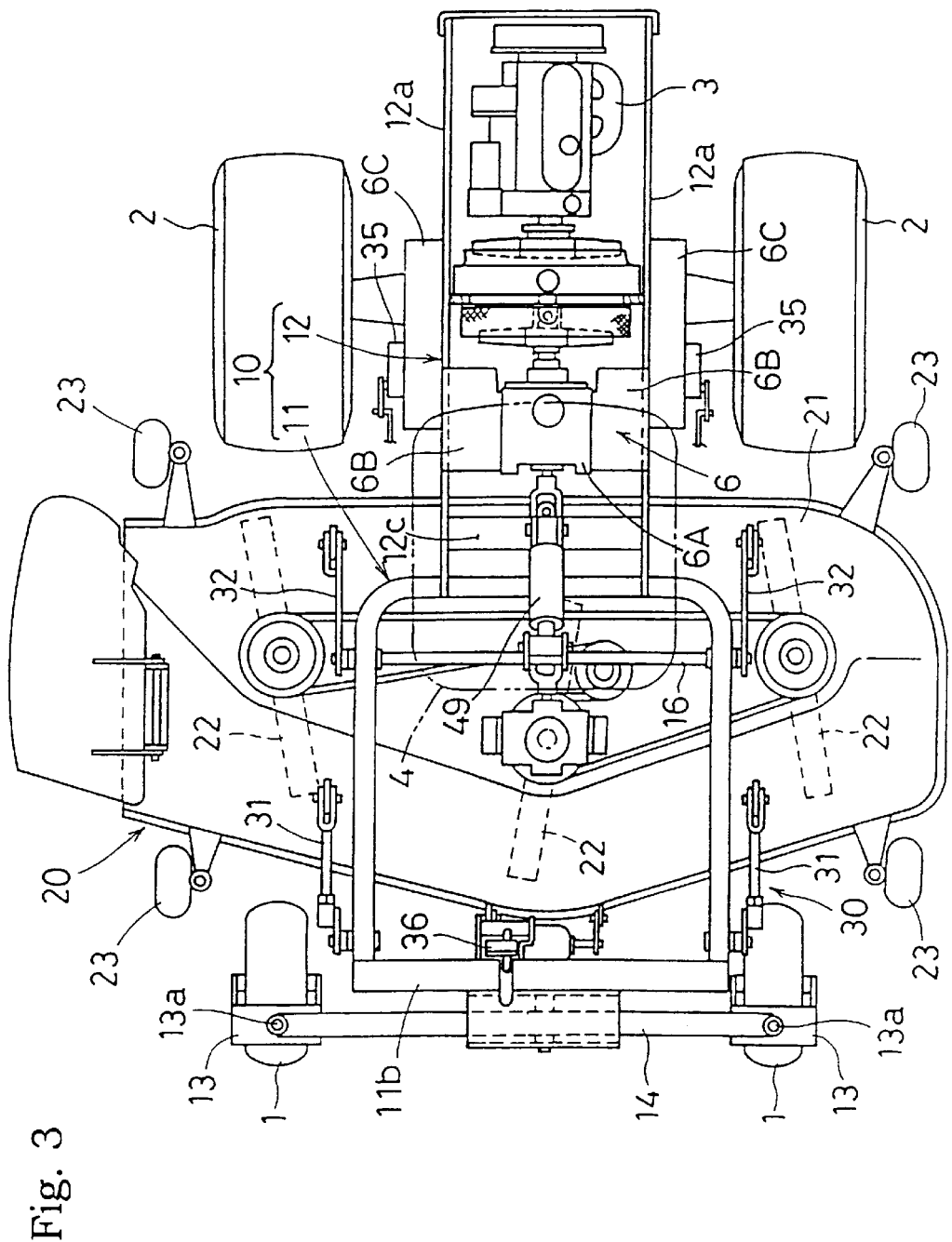
FIG. 3 is a plan view showing a frame structure and a transmission structure.

As shown in FIG. 3, the mower unit 20 includes, besides the mower deck 21, a plurality of rotary cutting blades 22 arranged in the mower deck 21 transversely of the vehicle body, and gauge wheels 23 attached to the front and rear of mower deck 21. Thus, the link type connecting mechanism 30 is operated to lower the mower unit 20 relative to the vehicle body 10. The mower is driven to run with the mower unit 20 placed in the lowered, operative state, with the cutting blades 22 rotated about vertical axes by drive transmitted from the engine 3. Grass is cut at a cutting height determined by a height of attachment to the mower deck 21 of the gauge wheels 23 or by a height of suspension of the mower unit 20 relative to the vehicle body 10.

As shown in FIG. 3, the vehicle body 10 is formed of a front body frame 11 and a rear body frame 12. The rear body frame 12 includes a pair of right and left rear main frame portions 12a extending longitudinally of the vehicle body 10, and a seat supporting frame portion 12b extending between forward ends of the right and left rear main frame portions 12a.

A front wheel support frame 14 has front wheel supporting members 13 connected to opposite ends thereof for freely rotatably supporting the left front wheel 1 and right front wheel 1, respectively. The front wheel support frame 14 is connected in an intermediate position thereof to a front connecting frame portion 11b of the front body frame 11.

Each of the right and left front wheel supporting members 13 is connected to a boss 14a of front wheel support frame 14 to be freely rotatable about a caster axis 13a horizontally displaced from an axis 1a of front wheel 1. Consequently, the right and left front wheels 1 are supported at the front end of the vehicle body 10 through the front wheel supporting members 13 and front wheel support frame 14. The front wheels 1 act as caster wheels with a direction of attachment to the front wheel support frame 14 freely variable about the caster axes 13a.

Figure 4:
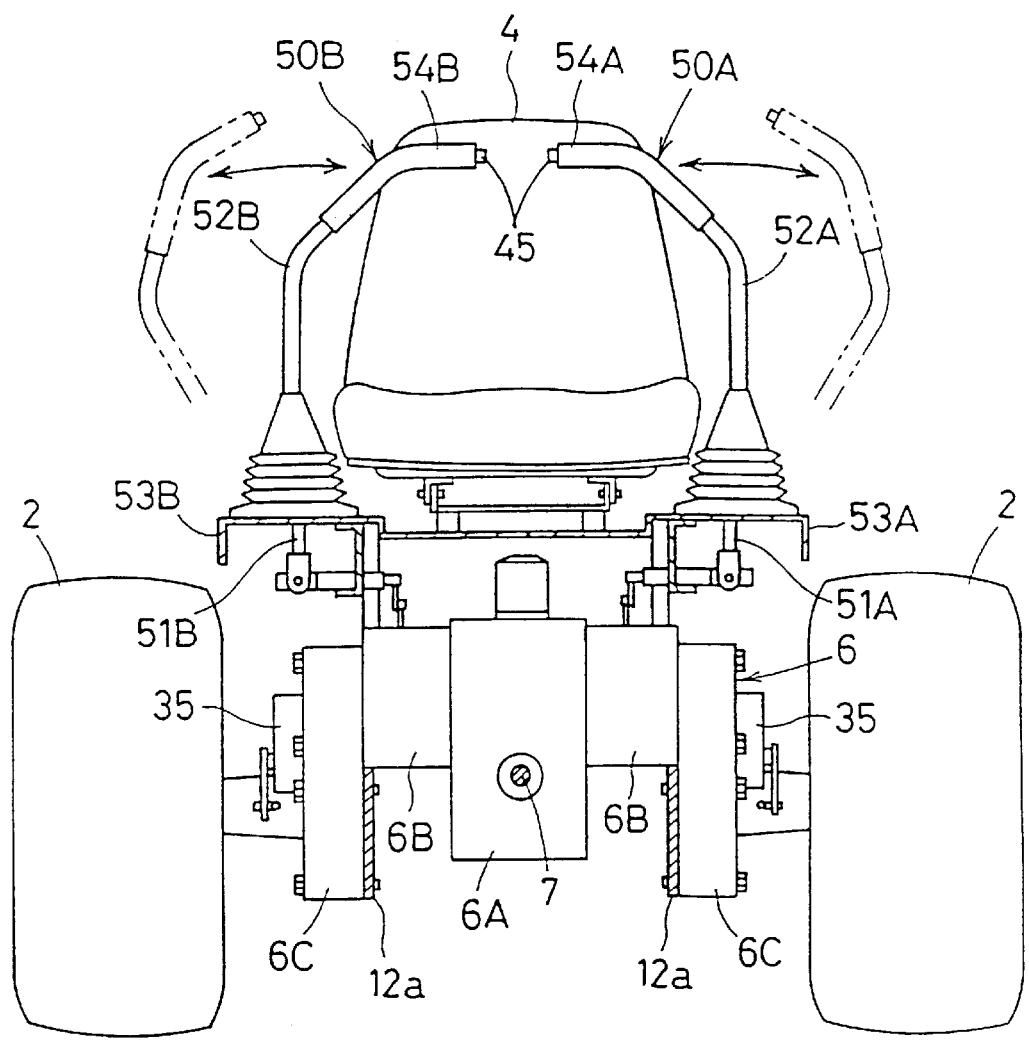
FIG. 4 is a front view of a driving platform of the lawn mower shown in FIG. 1.

As shown in FIGS. 3 and 4, the transmission 6 includes a main transmission case 6A having a transmission shaft for transmitting torque output of the engine to a downstream stage, a pair of stepless speed variators 6B for transmitting output of the transmission shaft of main transmission case 6A to downstream stages, and a pair of wheel transmission cases 6C having output shafts for driving the right and left rear wheels 2, respectively. Traveling brakes 35 are provided on side walls of the right and left wheel transmission cases 6C, to be operable by depressing a brake pedal 36 disposed on the driving platform 5. A control lever 69 disposed at the left side of driver's seat 5 is a parking brake lever. When this lever is pulled up with the brake pedal 36 depressed, the traveling brakes 35 are maintained in an operative state.

Each of the stepless speed variators 6B for transmitting drive to the right and left rear wheels 2 is a hydrostatic stepless transmission having a hydraulic pump driven by the engine 3, and a hydraulic motor driven by pressure oil from the hydraulic pump to output torque to the rear wheel 2. By varying a swash plate angle of the hydraulic pump, the rear wheel 2 is driven forward or backward, or power transmission may be broken to stop the rear wheel 2. The speed of torque transmission may be varied steplessly whether the mower is driven forward or backward.

As shown in FIGS. 1 and 4, a left running and steering control lever 50A and a right running and steering control lever 50B are arranged at opposite sides adjacent the forward end of driver's seat 4. The left running and steering control lever 50A is interlocked to a control portion of the stepless transmission 6B for the left rear wheel 2. The right running and steering control lever 50B is interlocked to a control portion of the stepless transmission 6B for the right rear wheel 2.

Figure 5:
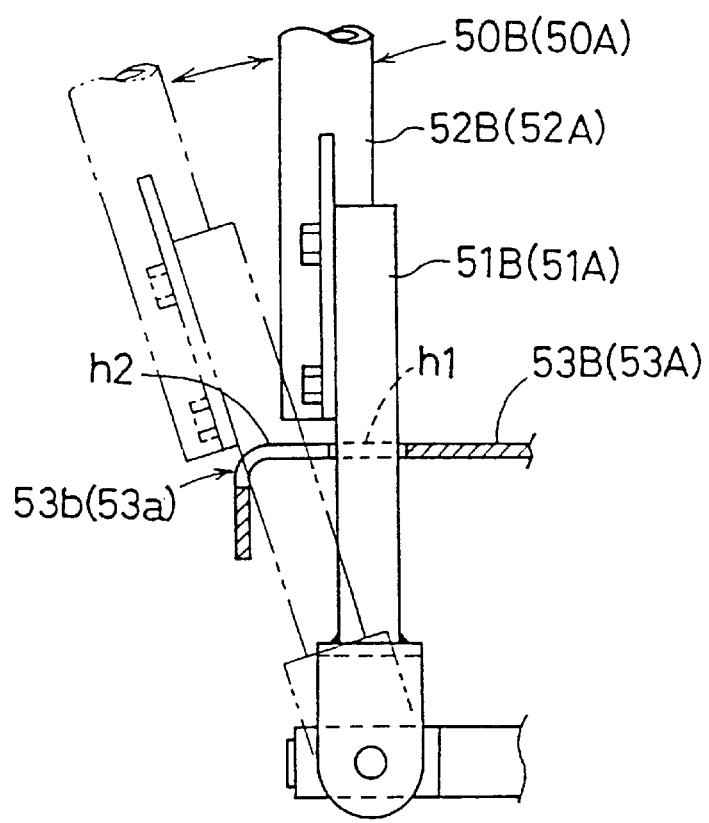
FIG. 5 is a front view of a steering lever.
Figure 6:
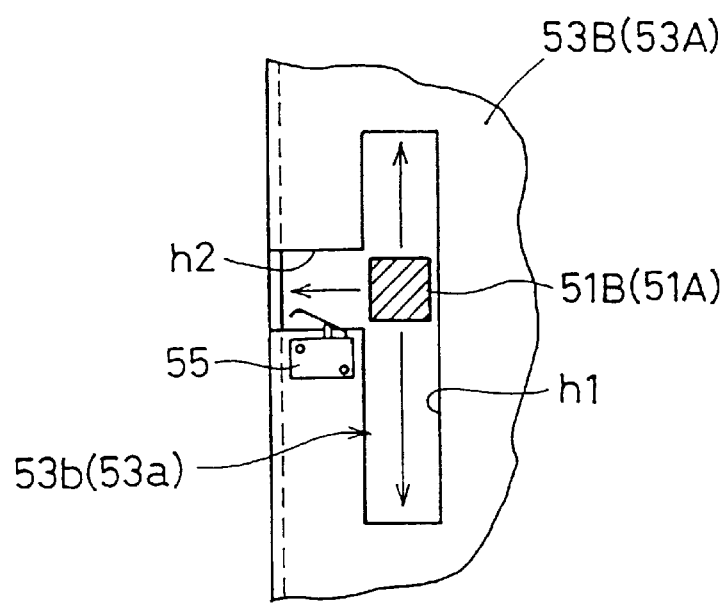
FIG. 6 is a plan view of the steering lever.

As shown in FIGS. 5 and 6, each of the running and steering control levers 50A and 50B includes a proximal link portion 51A or 51B interlocked to the stepless transmission 6B, and an operating portion 52A or 52B extending upward from the link portion 51A or 51B to be pivotable right and left. The operating portion 52A or 52B is movable under guiding action of a T-shaped guide groove 53a or 53b formed in a guide plate 53A or 53B. The guide groove 53a or 53b includes a shift region h1 for allowing a fore and aft pivotal movement of the operating portion 52A or 52B, and a retract region h2 for allowing the operating portion 52A or 52B to retract outward from the shift region h1 in a neutral position of stepless transmission 6B. As shown in FIG. 4, the right and left operating portions 52A and 52B are curved, so that grips 54A and 54B at upper ends thereof lie close to each other when the control levers 50A and 50B are operated the same amount to be placed in corresponding positions in the shift regions h1.

The left running and steering control lever 50A is pivotable in the fore and aft direction of the vehicle body to shift the stepless transmission 6B for driving the left rear wheel 2 forward or backward or stopping the left rear wheel 2. The right running and steering control lever 50B is pivotable in the fore and aft direction of the vehicle body to shift the stepless transmission 6B for driving the light rear wheel 2 forward or backward or stopping the right rear wheel 2. When the right and left rear wheels 2 driven at an equal variable speed forward or backward, the mower travels straight forward or backward, with the right and left front wheels 1 engaging the ground and turned straight forward or backward by the propelling force of the rear wheels 2.

When the right and left rear wheels 2 are driven at different speeds forward or backward side, or when one of the rear wheels 2 is driven forward and the other backward, the mower makes a turn, with the right and left front wheels 1 engaging the ground and turned about the caster axes 13a by the propelling force of the rear wheels 2. The mower turns in a direction and with a turning radius determined by a difference in speed or direction between the right and left rear wheels 2.

The right and left running and steering control levers 50A and 50B are thus movable through the shift regions hi longitudinally of the vehicle body, to selected shift positions. The control levers 50A and 50B may be retracted outwardly, leftward and rightward, from the neutral positions in the shift regions h1, to prohibit a shifting operation.

In this stopped state, with a shifting operation prohibited, the running and steering control levers 50A and 50B are opened to a large extent sideways away from each other. The driver may board or alight from the mower with little chance of inadvertently touching the levers 50A and 50B, and thus a reduced chance of operational errors.

A restraining mechanism operable when starting the engine 3 will be described next. As shown in FIG. 6, lever detectors 55 are provided for detecting the left and right running and steering control levers 50A and 50B switched to the sideways opened state. As shown in FIG. 8, a pedal detector 56 detects the brake pedal 36 operated to a brake applying position. The engine 3 may be restarted based on a result of detection by at least one of the detectors 55 and 56.

Signals from the detectors 55 and 56 are processed by a controller 47 to enable a starting operation by a key switch 58. This operation is communicated to an engine starting device 59 such as a starter motor through a connector 60 such as a relay.

Figure 7:
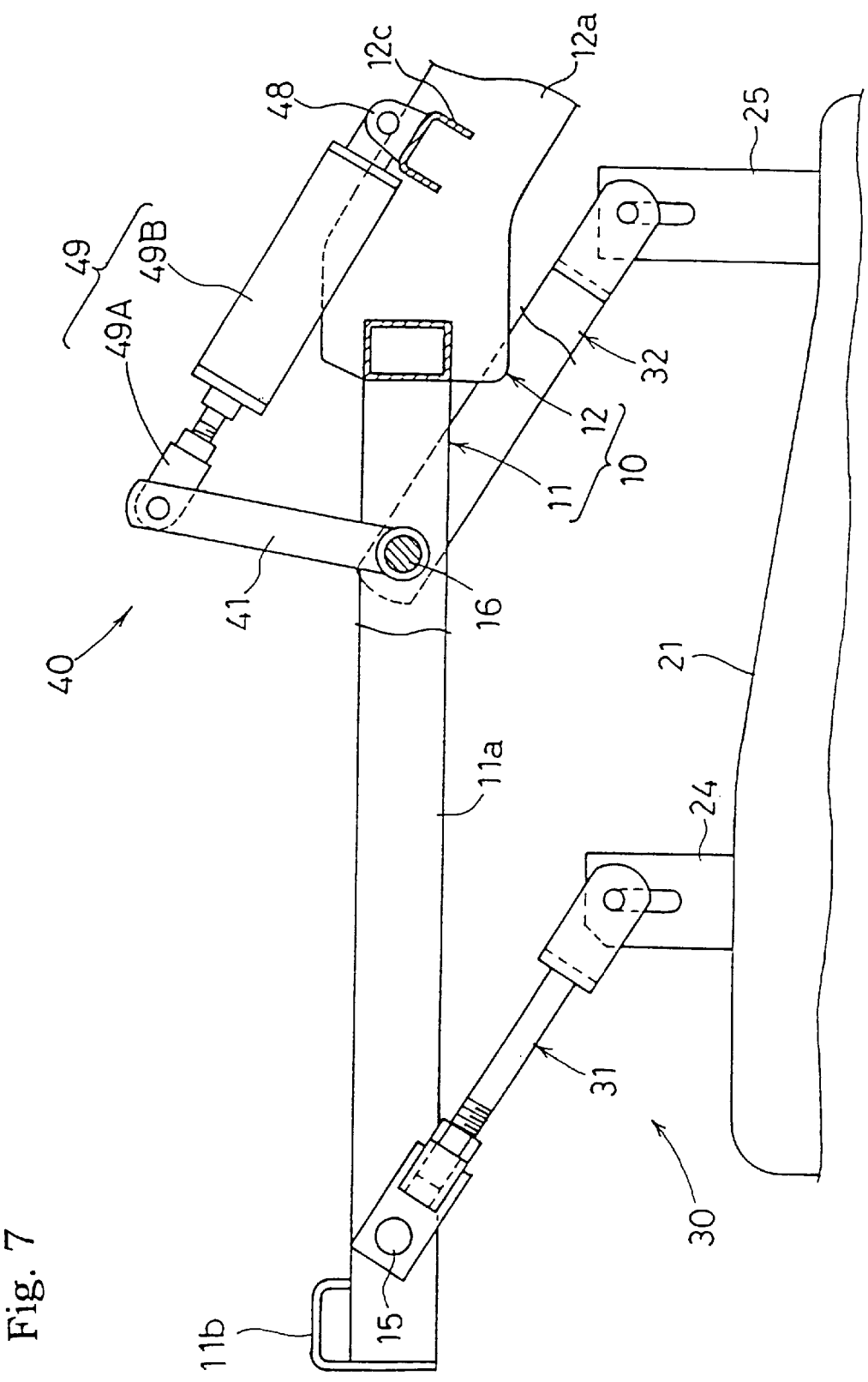
FIG. 7 is a side view a way in which a hydraulic lift cylinder is mounted.

As shown in FIGS. 1 and 7, the link type connecting mechanism 30 includes a pair of right and left front pivot links 31 arranged at opposite sides of a forward portion of the front body frame 11, and a pair of right and left rear pivot links 32 arranged at opposite sides of a rearward portion of the front body frame 11.

The right and left front pivot links 31 of the link type connecting mechanism 30 are vertically pivotably supported by forward portion of the front body frame 11 through connecting rods 15. The front pivot links 31 vertically movably connect front brackets 24 on the mower deck 21 of mower unit 20 to the front body frame 11. The right and left rear pivot links 32 are vertically pivotably supported by the rear end of front body frame 11 through a single rotary shaft 16. The rear pivot links 32 vertically movably connect rear brackets 25 on the mower deck 21 of mower unit 20 to the front body frame 11.

As shown in FIGS. 3 and 7, a pair of right and left brackets 41 are attached to an intermediate position of the rotary shaft 16 rotatable with the rear pivot links 32. A lift cylinder (lift actuator) 49 has a piston head 49A connected between the right and left brackets 41. The lift cylinder 49 has a cylinder case 49B with the end thereof attached to a bracket 48. This bracket 48 is supported by a channel frame 12c extending between the rear main frame portions 12a. These components constitute a lift mechanism 40 for raising and lowering the mower unit 20 by driving the rear pivot links 32 with the lift cylinder 49. Numeral 42 in FIG. 1 denotes a pump for supplying pressure oil to the lift cylinder 49.

The pump 42 supplies pressure oil to the lift cylinder 49 through an electromagnetic valve 44 to move the mower unit 20 vertically. An oil line extending from the pump 42 through the electromagnetic valve 44 to the lift cylinder 49, though not shown, is formed by using wellknown elements and extends below the driver's seat 4 between front end regions of the right and left rear main frame portions 12a. The pump 42 is driven by a drive shaft projecting from the main transmission case GA.

As shown in FIG. 8, the electromagnetic valve 44 is switchable in response to a manual input by the driver and under control of the controller 47. For this purpose, a push-button switch 45 is mounted in one of the grips 54A and 54B of the right and left running and steering control levers 50A and 50B. Consequently, the driver may operate the switch 45 while keeping both hands on the right and left running and steering control levers 50A and 50B. The push-button switch 45 may be provided as shown in FIG. 9, to be pushed by one stage to raise the mower unit 20 and by two stages to lower the mower unit 20 under control of the controller 47. As shown in FIG. 10, a raising switch 46A and a lowering switch 46B may be arranged on one grip. The switch or switches noted above are operable to control only the lift cylinder 49. As shown in FIG. 2, the push-button switch 45 and a switch for controlling another actuator or the like may be provided on the right and left grips 54A and 54B, respectively.

As shown, in FIGS. 1 and 3, the lift cylinder 49 is disposed right under the driver's seat 4 and in a middle position transversely of the vehicle body 10. This arrangement provides advantages of securing a large space around the driver's feet, and assuring excellent stability of the vehicle body since a reaction from a vertical movement of the mower unit 20 is received in the middle position transversely of the vehicle body 10. This is well suited to the vehicle body construction since that middle position is the strongest part of the vehicle frames.

The electromagnetic valves 44 and other hydraulic devices are arranged rearwardly of the lift cylinder 49. This arrangement requires reduced lengths of hydraulic piping between such devices, involves reduced pressure loss, and secures a sufficient piping space.

The lift actuator is not limited to the hydraulic type, but may be an electric cylinder.

What is claimed is:

1. A lawn mower comprising:

a vehicle body;

front wheels disposed in front positions of said vehicle body;

rear wheels disposed in rear positions of said vehicle body;

a mower unit suspended from said vehicle body between said front wheels and said rear wheels;

a driver's seat disposed on said vehicle body above said mower unit;

a hydraulic cylinder for raising and lowering said mower unit, said hydraulic cylinder being disposed above said mower unit and below said driver's seat so as to vertically align said driver's seat, said hydraulic cylinder, and said mower unit;

a hydraulic pump disposed below said driver's seat and adjacent said hydraulic cylinder for supplying a hydraulic pressure to said hydraulic cylinder; and an engine disposed rearwardly of said driver's seat for driving said hydraulic pump.

2. A lawn mower as defined in claim 1, wherein said vehicle body includes a pair of right and left plate frames extending in a traveling direction, said actuator being disposed substantially between said plate frames.

3. A lawn mower as defined in claim 1, wherein said actuator is operable by a control switch disposed on a steering lever.

4. A lawn mower comprising:

a vehicle body;

freely rotatable front wheels disposed in front positions of said vehicle body;

a pair of right and left propelling rear wheels disposed in rear positions of said vehicle body, each of said rear wheels being rotatable in a forward or backward direction for propelling said vehicle body forwardly or backwardly;

an engine disposed between said rear wheels;

a pair of right and left speed variators disposed in front positions of said engine, said speed variators transmitting drive from said engine to said pair of rear wheels, respectively;

a steering control device operable to steer said vehicle body by setting rotating speeds and/or rotating directions of said rear wheels independently of each other by means of respective said speed variators;

a mower unit suspended from said vehicle body between said front wheels and said rear wheels;

a driver's seat disposed on said vehicle body forwardly of said engine and above said mower unit; and an actuator for raising and lowering said mower unit, said actuator being disposed forwardly of said speed variators, above said mower unit and below said driver's seat so as to vertically align said driver's seat, said actuator, and said mower unit.

5. A lawn mower as defined in claim 4, wherein said vehicle body includes a pair of right and left plate frames extending in a traveling direction, said speed variators being disposed between said plate frames and adjacent respective said plate frames, and said actuator being disposed substantially between said speed variators.

6. A lawn mower as defined in claim 4, further comprising a hydraulic pump disposed below said driver's seat and rearwardly of and adjacent to said actuator, said hydraulic pump supplying a hydraulic pressure to said actuator using the drive from said engine.

7. A lawn mower as defined in claim 4, wherein said steering control device includes a pair of right and left control levers disposed in front positions of said driver's seat, at least one of said control levers having a control switch at a grip thereof for operating said actuator.

\* \* \* \* \*

UNITED STATES PATENT AND TRADEMARK OFFICE
CERTIFICATE OF CORRECTION

PATENT NO.    : 6,530,200 B1
DATED         : March 11, 2003
INVENTOR(S)   : Minoura et al.

It is certified that error appears in the above-identified patent and that said Letters Patent is hereby corrected as shown below:

Column 2,
Line 2, "steeling lever" should read -- steering lever --.

Column 4,
Line 7, "light rear" should read -- right rear --.
Line 23, "regions hi" should read -- regions h1 --.

Column 5,
Line 20, "case GA" should read -- case 6A --.

Signed and Sealed this

Eighth Day of July, 2003

JAMES E. ROGAN
*Director of the United States Patent and Trademark Office*